United States Patent
Smith et al.

(10) Patent No.: US 6,540,969 B1
(45) Date of Patent: Apr. 1, 2003

(54) PREPARATION OF HEXAFLUOROPHOSPHORIC ACID

(75) Inventors: W. Novis Smith, Philadelphia, PA (US); Joel McCloskey, Philadelphia, PA (US)

(73) Assignee: Lithdyne LLC, Anaheim, CA (US)

( * ) Notice: Subject to any disclaimer, the term of this patent is extended or adjusted under 35 U.S.C. 154(b) by 131 days.

(21) Appl. No.: 09/723,841

(22) Filed: Nov. 28, 2000

(51) Int. Cl.[7] ............................................. C01B 25/10
(52) U.S. Cl. ..................................... 423/301; 423/317
(58) Field of Search .................................. 423/301, 317

(56) References Cited

U.S. PATENT DOCUMENTS

| 2,488,298 A | * | 11/1949 | Lange et al. ................. 423/301 |
| 2,488,299 A | * | 11/1949 | Lange et al. ................. 423/301 |
| 3,584,999 A | * | 6/1971 | Wiesboeck ................... 423/301 |

* cited by examiner

*Primary Examiner*—Stanley S. Silverman
*Assistant Examiner*—Maribel Medina
(74) *Attorney, Agent, or Firm*—John Lezdey

(57) ABSTRACT

The present invention provides a process for preparing hexafluorophosphoric acid complexed with about 1 to 3.3 molecules of water which are stable at temperatures below 20° C. and the compositions prepared thereby.

6 Claims, No Drawings

PREPARATION OF HEXAFLUOROPHOSPHORIC ACID

FIELD OF THE INVENTION

The present invention relates to the preparation of concentrated hexafluorophosphoric acid ($HPF_6$) complex solutions containing water.

BACKGROUND OF THE INVENTION

Known processes for the production of hexafluorophosphoric acid include:

1. $H_3PO_4 + 6\ HF \rightarrow HPF_6 + 4\ H_2O$
2. $P_2O_5 + 12\ HF \rightarrow 2HPF_6 + 5\ H_2O$
3. $2H_3PO_4 + 6\ CaF_2 \rightarrow PF_5 + HPF_6 \cdot 2H_2O + HF + 6Ca\ SO_4$ The preparation of hexafluorophosphoric acid is usually accomplished by the addition of anhydrous HF to phosphoric acid or phosphorus pentoxide. The preparation using pure phosphorus pentoxide is difficult since it is a dry air sensitive powder and therefore some liquid phase is usually added to facilitate blending and reaction with the HF. This results in a $H_2O/HPF_6$ ratio of about 3–4, never achieving the theoretical 2.5 ratio of water to $HPF_6$ when using $P_2O_5$.

U.S. Pat. No. 3,634,034 to Nickerson et al, which relates to process 3, produces along with phosphorous pentafluoride, $HPF_6$ and calcium sulfate. Separation problems and disposal of large amounts of calcium sulfate must be addressed with the process.

$HPF_6$ is not stable at ambient conditions without a stabilizing coordination complex like water. In fact, very little or no $PF_6$ is absorbed when bubbled into anhydrous HF at 0° C. showing that no complex is formed without water being present.

The presence of excess water is undesirable in solutions of hexafluorophosphoric acid because it promotes hydrolysis of the $PF_6$ anion to partially oxygenated species. In addition, it decreases the overall effectiveness and acidity of the acid and dilutes the concentration of the acid. It also adds extra shipping weight to cost. The pure hexafluorophosphoric acid has not been reported under ambient conditions (atmospheric pressure and room temperature).

Therefore, there exists a need to provide high purity $HPF_6$ in high concentrations that is stable at ambient conditions and can be prepared in a simple and economical procedure.

SUMMARY OF THE INVENTION

According to the present invention, there is provided a stable hexafluorophosphoric acid complexed with water having about 1.0 to 3.3 molecules of water to one hexafluorophosphoric acid molecule at 20° C. and the process for its preparation.

According to one embodiment of the invention, there is prepared a hexafluorophosphoric acid composition compound having at least one molecule of water per hexafluorophosphoric acid molecule at temperatures below 20° C., preferably 1.6 to 1.7 molecules of water to one hexafluorophosphoric acid molecule.

According to another embodiment of the invention, there is further prepared a 1.7 mole ratio of $H_2O/HPF_6$ complex which is about 83% $HPF_6$ concentration from polyphosphoric acid.

According to a further embodiment of the invention hexafluorophosphoric acid monohydrate is prepared.

Therefore, an object of the present invention to provide an improved process for the preparation of a stable high purity hexafluorophosphoric acid complex in high yields.

Another related object of the present invention is to provide a process which is highly efficient and economical.

A further object of the present invention is to provide a process which produces a minimum amount of by-products.

DESCRIPTION OF THE PREFERRED EMBODIMENTS

It has found that to stabilize $HPF_6$, adding only enough water to maintain its vapor pressure at about that of one atmosphere is essential. Preferably, the amount of water necessary is at least one molecule of water per hexafluorophosphoric acid molecule below 10° C. and more preferably 1.6–1.7 molecules of water to one hexafluorophosphoric acid molecule at about 20° C. This solution can be kept in a Teflon bottle, polyethylene bottle or in a steel low-pressure cylinder.

Extra HF can also be added, but it does not contribute significantly to the stabilization of the $PF_6$ anion at these high concentrations. Since it is desirable to have as little water as possible and maximize the highest concentration of the hexafluorophosphoric acid, the preferred ratio is about 1.6–1.7. The highest $HPF_6$ concentrations available from other conventional routes can produce water/hexafluorophosphoric acid ratios only greater than 3.3 on a practical basis.

According to the present invention, one is able to produce these concentrated solutions of hexafluorophosphoric acid (ratios from 1 to 3.3) by adding $PF_5$ gas with cooling to various concentrations of HF in water (from 25% to 52% by weight HF) to produce the desired low ratios or amounts of water in the product. The phosphorous pentafluoride can contain phosphorous oxyfluoride ($POF_3$).

According to a further embodiment of the invention, one can produce these same high concentrations of hexafluorophosphoric acid (low water, 11–28% by weight) by adding $PF_5$ gas to already prepared solutions of hexafluorophosphoric acid which have water ratios higher than 3 and which also contain the calculated amount of excess HF to form the desired concentration of hexafluorophosphoric acid having low water (ratio of 1 to 3).

According to the present invention, a stable colorless crystalline 1:1 $HPF_6/H_2O$ complex forms below 10° C. when $PF_5$ is bubbled into essentially 50% HF/water below 10° C., namely 0–5° C. This complex appears to melt with decomposition in the 10–12° C. range. This crystalline complex also forms a slurry in solutions with the $H_2O/HF$ ratio from 1 to 2 below 10° C. These solid complexes decompose giving off $PF_5$ when the solutions are warmed to 20° C. (room temperature). The equilibrium concentration in a closed bottle (fluorocarbon or polyolefin) at approximately one atmosphere is a mole ratio of $H_2O/HPF_6$ of 1.6–1.7 (about 83±2% by weight $HPF_6$ and 17±2% water).

According to the present invention, the process is as follows:

1) $PF_5 + HF(1\ to\ 3.3\ moles\ water\ for\ each\ HF) \rightarrow$
   The ratio of $H_2O/HPF_6$ is 11–29. $HPF_6 + 1$–$3.3\ H_2O$
2) $PF_5 + HPF_6/3.33\ H_2O + HF \rightarrow HPF_6 + 1$–$3.3\ H_2O$
   The ratio of $H_2O/HPF_6$ is 11–29.

EXAMPLE 1

The starting solutions of HF/water were prepared by diluting 52% $HF(H_2O/HF$ mol ratio of 1.0) with distilled water to achieve ratios of 1.1 through 2.2. About 25–35 g. of the specific $H_2O/HF$ mol ratio were placed into a weighed polyethylene bottle containing a magnetic stirrer under argon and the weight determined. The whole bottle was maintained at 0–5° C. with cooling and stirring. $PF_5$ gas was slowly passed through the solution until $PF_5$ was no longer absorbed as noted by the fumes coming out of the vent tube.

The bottle was removed and weighed and the weight gain (amount of $PF_5$) absorbed noted. The bottle was allowed to warm up to 20° C. and vented carefully over several hours while the gas pressure came to equilibrium. The remaining amount of absorbed $PF_5$ was noted. The $H_2O/HPF_6$ mol ratio in these relatively stable solutions was noted and are given in Table 1. The resulting ratio for these stable solutions is 1.6–1.7 for $H_2O/HPF_6$ mol ratio.

under 20° C. The rate of reaction was steady throughout the addition with the mixture becoming quite fluid after about 10% addition. The whole addition using ice water as the coolant took about 1.5 hours. The reaction mixture was allowed to stir and come up to room temperature. The yield of hexafluorophosphoric acid is 100% with respect to contained fluoride and phosphorus. (Note that it is actually an equilibrium mixture and the effective concentration is about 62% to 65% by $PF_6$ precipitation. Excess HF will bring the effective concentration up to the theoretical concentration. The water content is 29% with a mole ratio of water to calculated hexafluorophosphoric acid of 3.3

TABLE 1

Comparative Stabilities of $HPF_6$ Containing Various Ratios of Water

| | Theoretical (based on $H_2O$/HF Present) Test Mol Ratio of $H_2O/HPF_6$ | Actual Mol Ratio Found | Actual % Wt. $HPF_6$ Found | Comments |
|---|---|---|---|---|
| 1. | 0 (no water present-anhydrous HF) | 0 | 0 | $HPF_6$ not stable at 0° C. |
| 2. | 1.1 | 1.1 | 87.0 | Stable <10° C. Solid |
| | Warmed to 21° C. | 1.6 | 83.0 | Stable at 20° C. Solution |
| 3. | 1.5 Warmed to 21° C. | 1.7 | 82.5 | Stable at 20° C. |
| 4. | 1.6 Warmed to 21° C. | 1.6 | 83.3 | Stable at 20° C. |
| 5. | 1.9 Warmed to 21° C. | 1.6 | 82.9 | Stable at 20° C. |
| 6. | 2.2 Warmed to 21° C. | 1.5 | 84.5 | Stable at 20° C. |
| 7. | 3.3 (From PPA as raw material) 1.6 mol equiv. HF added | 1.6 | 83.1 | Stable at 20° C. |
| Prior Art | | | | |
| 8. | >3.5 Commercial $HPF_6$ | >3.5 | 68 | Stable at 20° C. |

No additional $PF_5$ added

Experiment 1 was done with anhydrous HF without any water added. Only a trace amount of $PF_5$ dissolved in the anhydrous HF and was stabilized as $HPF_6$. As shown by the results listed in Table 1, at least a $H_2O/HPF_6$ mol ratio of 1.0 (below 10° C.) and preferably 1.6 at room temperature is needed to produce a stable $HPF_6$ solution (a vapor pressure less than about 200 mm Hg).

In experiment 6, a lower water $HPF_6$ solution (3.3 $H_2O/HPF_6$ mol ratio) prepared by the reaction of polyphosphoric acid (116% $H_3PO_4$) and anhydrous HF was upgraded to an even lower water level by adding 1.3 equivalents of HF and then saturated with $PF_5$ at 10° C. to produce a $HPF_6$ acid solution with a $H_2O/HPF_6$ mol ratio of 2.0.

The same approach can be done with $HPF_6$ solutions of any concentration by adding the appropriate amount of HF and then saturating with $PF_5$ to bring the $H_2O/HPF_6$ mol ratio below 3.5 and preferably about 1.5 to 2.0. Thereby producing a minimum water content $HPF_6$ (73–89% $HPF_6$)

EXAMPLE 2

Preparation of $HPF_6$ With PPA (116% Phosphoric Acid)

A charge of 1200 g of 116% polyphosphoric acid (equivalent to 14.06 mole phosphoric acid) was added to an 1-gal Inconel reactor stirred with a Teflon stirrer. (The PPA is warmed to about 60° C. to gain flowability of the normally very viscous material.) The stirrer was adjusted to be just above the surface of the viscous PPA. The reactor is cooled to about 5–15° C. with the stirrer just above the surface of the PPA. 1716 g. of anhydrous HF (about 2% excess) was slowly added to the stirred reaction mixture with sufficient cooling to maintain the temperature under 25° C., preferably The advantages of the present process over previous methods are many.

1) All of the phosphorus containing material can be added at once in the beginning.

Normally the reaction of phosphorus pentoxide is too vigorous and it is a deliquescent difficult and hazardous powder to handle. Therefore it is usually added in steps after some of the HF has already been added to the reactor. This in itself is a hazardous procedure. Sometimes phosphoric acid crystals are added initially to form a "heel" of liquid in order to add the phosphorus pentoxide solid powder to a liquid and maintain stirrability.

2) The PPA (116% equivalent to $H_3PO_4$) produces the minimum amount of water relative to hexafluorophosphoric acid of any material except phosphorus pentoxide which practically cannot be used by itself on commercial scale without the co addition of phosphoric acid.

3) The PPA is also lower in cost than phosphoric acid or phosphorus pentoxide.

4) PPA is lower in cost, faster to produce, safer to produce, and yields the highest concentration of hexafluorophosphoric acid with respect to contaminating water of all direct HF processes.

EXAMPLE 3

A solution of 300 g of 40.3% by weight hydrofluoric acid was prepared by adding 54 g water to 246 g of 49% hydrofluoric acid with cooling in a fluorocarbon polymer container (FEP). The solution was stirred and cooled with an ice bath to maintain the solution between 10–15° C. while $PF_5$ gas was slowly added to the solution by means of a FEP tube which was below the surface of the stirred solution. The addition was stopped when 882 g of $PF_5$ gas had been added and the tubing removed and the container closed. The resulting solution weighed 1180 g and contained 83% by weight hexafluorophosphoric acid with a ratio of $H_2O/HPF_6$ of 1.65. At room temperature the bottle when opened had a slight vapor pressure and fumed.

EXAMPLE 4

A charge of 1200 g of 116% polyphosphoric acid (equivalent to 14.06 mole phosphoric acid) was added to an 1-gal Inconel reactor stirred with a Teflon stirrer. (The PPA is warmed to about 60° C. to gain flowability of the normally very viscous material.) The stirrer was adjusted to be just above the surface of the viscous PPA. The reactor is cooled to about 5–15° C. with the stirrer just above the surface of the PPA. 1716 g. of anhydrous HF (about 2% excess) was slowly added to the stirred reaction mixture with sufficient cooling to maintain the temperature under 25° C., preferably under 20° C. The rate of reaction was steady throughout the addition with the mixture becoming quite fluid after about 10% addition. The whole addition using ice water as the coolant took about 1.5 hours. The reaction mixture was allowed to stir and come up to room temperature. The yield of hexafluorophosphoric acid is 100% with respect to contained fluoride and phosphorus. (Note that it is actually an equilibrium mixture and the effective concentration is about 62% to 65% by $PF_6$ precipitation. Excess HF will bring the effective concentration up to the theoretical concentration. The water content is 29% with a mole ratio of water to calculated hexafluorophosphoric acid of 3.3.

EXAMPLE 5

Preparation of low water hexafluorophosphoric acid using already prepared $HPF_6$. The 300 g of the hexafluorophosphoric acid from example 2 above was placed in a FEP bottle and stirred with cooling. Then 59 grams anhydrous HF were added while maintaining the solution at 10 to 15° C. To this solution was added 369 g $PF_5$ gas over 2 hours through a FEP tube while maintaining the solution at 10 to 15° C. The resulting solution weighed 125 g and contained 83% $HPF_6$ with a molar ratio of $H_2O/HPF_6$ of 1.65.

While in the foregoing specification we have set out specific procedures in considerable detail for the purpose of illustrating embodiments of the invention, it will be understood that such details may be varied widely by those skilled in the art without departing from the spirit of our invention.

What is claimed is:

1. A process for producing a hexafluorophosphoric acid complex containing 1 to 3.3 molecules of water per molecule of hexafluorophosphoric acid by reacting phosphorus pentafluoride with an aqueous solution of hydrofluoric acid comprising 50% by weight of hydrogen fluoride at about 0 to 5° C.

2. The process of claim 1 wherein said aqueous solution comprises about 25 to 95% by weight hydrofluoric acid.

3. The process of claim 1 further comprising adding phosphorous pentoxide.

4. The process of claim 1 wherein phosphorus pentafluoride is added to an aqueous solution of about 20 to 76% hexafluorophosphoric acid and an equivalent molar amount of hydrogen fluoride to the phosporus pentafluoride and a composition comprising 70 to 89% by weight of hexafluorophosphoric acid is formed.

5. The process of claim 4 wherein said phosphorous pentafluoride contains phosphorous oxyfluoride.

6. A process for preparing a stable hexafluorophosphoric acid complex having 1 to 1.7 molecules of water per molecule of hexafluorophosphoric acid comprising adding anhydrous hydrofluoric acid to an aqueous solution of polyphosphoric acid which comprises about 72 to 95 percent by weight of phosphorous pentoxide at a temperature not greater than 20° C.

* * * * *